Oct. 25, 1966        F. C. DANNEMAN        3,281,189
                     DIE-SET BEARING

Filed Feb. 7, 1964                    2 Sheets-Sheet 1

INVENTOR.
FREDERICK C. DANNEMAN
BY Brumbaugh, Free, Graves &
   Donohue
              his  ATTORNEYS

United States Patent Office 3,281,189
Patented Oct. 25, 1966

---

3,281,189
DIE-SET BEARING
Frederick C. Danneman, New York, N.Y., assignor to Acme-Danneman Company, Inc., New York, N.Y., a corporation of New York
Filed Feb. 7, 1964, Ser. No. 343,256
4 Claims. (Cl. 308—6)

This invention relates to die-set bearings and, more particularly, to a novel and improved die-set bearing having a particularly long useful life and capable of being quickly and easily replaced. The bearing can be used not only in die sets but in any device wherein there is relative co-axial movement between two members.

The increases in efficiency and capacity of forming equipment such as punch presses, stamping dies and the like in recent years has necessitated the development of die-sets which are able to maintain very precise alignment of the relative moving members, provide as small frictional and compressive loads as possible in order to reduce heating and wear of the bearings, and to provide as long a useful life as possible in order to reduce the shut-down time and the frequency of shut-down in automated production lines. Stamping and punching equipment is now available which operates at speeds as high as 1200 or more cycles per minute, so that die-set bearings wear out more quickly and must be replaced quite frequently.

In ball bearing die-sets, a principal type of wear is the formation of lengthwise grooves in the bushing and leader pin by the movement of several balls in each of a relatively limited number of longitudinally extending planes. The lateral loads on the balls relatively quickly produce the tracks, thereby loosening the bearing, enabling rocking or wobbling of the leader pin in the sleeve and thereby facilitating the misalignment and defective operation of the punch and die, forming die or the like. When this occurs, the bearing must be replaced. While the replacement of die-set bearings usually can be accomplished in a matter of a few minutes, the very fast operating speeds of modern equipment results in very significant losses in total production when even small amounts of time are lost.

One problem encountered in the replacement, as well as in the initial assembly, of the bearings is the difficulty of obtaining proper initial line-up of the leader pin, retainer and bushing. Some die-set bearings are provided with a single helical row of balls extending continuously around the retainer so that no two bearings are located in any one plane normal to the axis of the leader pin. A single helical row of balls has the important disadvantage of enabling an initial misalignment of the bearing elements and a consequent danger of damage to a punch and die during assembly and replacement of the bearings. More particularly, the existence of only one, or in some bearings, two balls in a given plane normal to the axis of the bearing enables the placement of the leader pin in an off-center relation to the bushing. The off-center placement may not be entirely corrected as the ball retainer and leader pin are inserted further into the bushing, and it is possible to damage the punch or die or both to an extent that their replacement is required because of unintended forceful contact between parts due to misalignment.

A further difficulty with presently known ball bearing die-sets is the relatively large resistance to assembly caused by the heavy preloading of the balls. In such die-sets, the balls have a diameter somewhat greater than the width of the annular space between the leader pin and the bushing to provide the required resistance to lateral thrusts. Because of this heavy preloading, force (however insignificant) must be used to overcome resistance when the top of the leader pin or guide pin enters each transverse row of balls during assembly of the bearings. An important element in the proper assembly of dies is the guide bearings, which must give a smooth and even flow so that the diemaker is able to feel contact between entry of the male into the female part, and with present very close tolerances between punch and dies any interrupted or uneven movement may damage expensive die parts.

At least two factors contribute to the "feel" of the die-set bearing, first, the resistance encountered in assembly, which is due principally to the preloading of the balls, and second, the longitudinal spacing between the balls. In some die-set bearings there are, say, seven or eight or more balls in each of relatively few, widely spaced transverse planes. The movement of the leader pin and retainer into the bushing in such bearings, and in similar arrangements, is jerky or hesitant at intervals; that is, as each transverse row of balls comes into its loaded state, the movement of the leader pin and ball retainer into the bushing is resisted, the resistance often being considerable. Such resistance hides, so to speak, resistances from other source. The "feel" of such bearings is poor, and the assembler often cannot detect misalignment or other imperfections of assembly and fit.

The above-mentioned and other disadvantages of presently known die-set bearings are overcome, in accordance with the invention, by providing a novel and improved die-set bearing, comprising a bushing, a retainer positioned in the bore of the bushing, a leader pin movably positioned within the retainer, and a plurality of balls rotatably disposed in holes in the retainer, each ball contacting at diametrically opposite points of the bushing and the leader pin. The balls in the retainer are arranged in a specific manner to provide a considerably greater distribution of the forces imposed upon the bushing and leader pin. More particularly, the balls are arranged such that only a single ball is centered on any given plane extending radially from and including the axis of the bearing. Accordingly, the tendency of the balls to form tracks in the bushing or leader pin is very substantially reduced, inasmuch as the forces and the consequent wear are distributed over a large number of longitudinal tracks. Further, the balls are arranged so that exactly three balls lie in each of two spaced-apart planes normal to the axis of the bearing, the balls in those two planes constituting the end-most balls in the retainer. Additionally, three balls in those end planes are arranged such that the triangle defined by lines connecting their centers encompasses the axis of the leader pin. Therefore, the elements of the bearing are positioned in proper alignment when assembly is commenced, unlike presently known die-set bearings wherein only one or two balls are located in the end-most planes of the retainer. Preferably, the three bearings in each of the end planes are spaced apart circumferentially at 120°, thereby providing symmetrical support for the leader pin.

In a preferred arrangement the balls are disposed in the retainer in exactly three separate helical rows extending about the retainer, the balls in each row are spaced apart an equal distance, and all three helices have the same pitch angle. With that arrangement there will be three balls in each of a plurality of spaced-apart planes normal to the axis of the bearing. Further, the helices are spaced apart circumferentially so that the leader pin is supported and centered at three points in each of the transverse planes, 120° spacing being preferred.

A bearing, in accordance with the invention, is provided with a specified number of balls to obtain a predetermined number of contact points per square inch of bushing bore surface area, the number being considerably greater than in conventional bearings and providing as much as three times the total contact area. The greater number of balls enables a corresponding reduction in the pre-load of the balls, and the greater number and less pre-load enable very substantial reductions in unit loads and much more even distribution of total loads on the bearing elements.

The particular arrangement of balls in a bearing, in accordance with the invention, affords a much longer useful life for the bearing, inasmuch as the tendency of the balls to form tracks in the bushing and leader pin is very considerably reduced by providing only one ball in any given longitudinal plane. Further, by providing exactly three balls in planes normal to the axis of the leader pin at the ends of the retainer, the initial force required to insert the leader pin and retainer into the bushing is considerably reduced, when compared to present bearings wherein as many as seven or eight or more balls may be arranged in the end planes and in each of several other transverse planes. On the other hand, the disposition of exactly three balls in single planes near the ends of the retainer provides the advantage over presently known bearings having a single helical row of balls of immediately aligning the elements of the bearing. Accordingly, a die-set bearing, in accordance with the invention, is assembled more quickly, accurately and easily than presently known die-set bearings.

For a better understanding of the invention, reference may be made to the following description of an exemplary embodiment, taken in conjunction with the figures of the accompanying drawings, in which.

Figure 1:
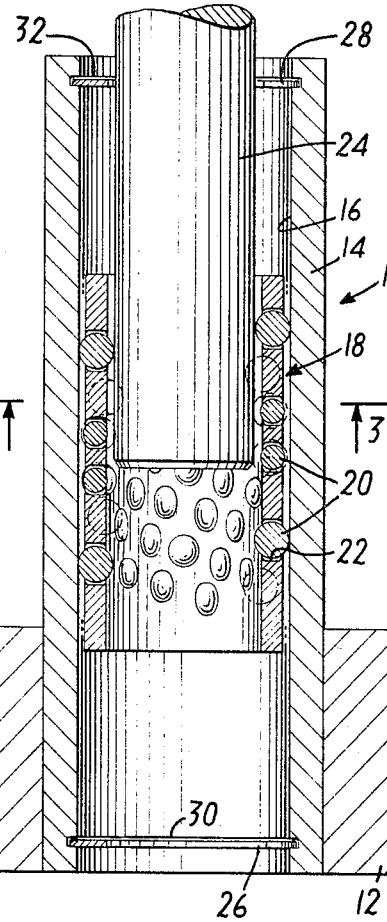
FIGURE 1 is a view in section through the axis of the bearing.

Referring to FIG. 1, the bearing 10 is shown installed in a segment of a base-plate 12 of a die-set, the bearing 10 held in position therein by any suitable means (not shown), many of which are well known to those skilled in the art. The bearing 10 includes a bushing 14 having a bore 16, a retainer 18, a plurality of balls 20 rotatably carried in holes 22 in the retainer 18, and a leader pin 24. Snap-in retainer rings 26 and 28 held in grooves 30 and 32 formed near the ends of the bore 16 in the bushing 14 prevent the retainer from dropping or being pulled out of the bushing 14 when the leader pin 24 is withdrawn from the bearing. When the leader pin is installed, the elements of the bearing are slidably held together by the pre-loading of the balls between the bushing and leader pin and the resulting frictional forces. The balls, of course, roll upon co-axial relative movement between the leader pin and bushing.

Figure 4:
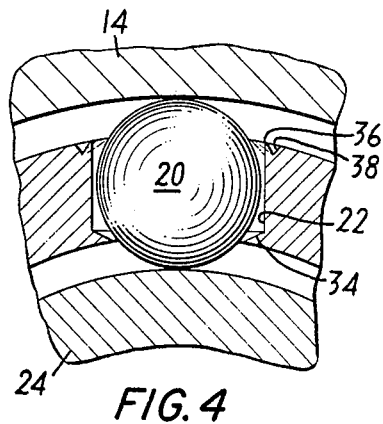
FIG. 4 is a detailed view in section on a greatly enlarged scale illustrating the structure of the retainer whereby the balls are held therein.
Figure 3:
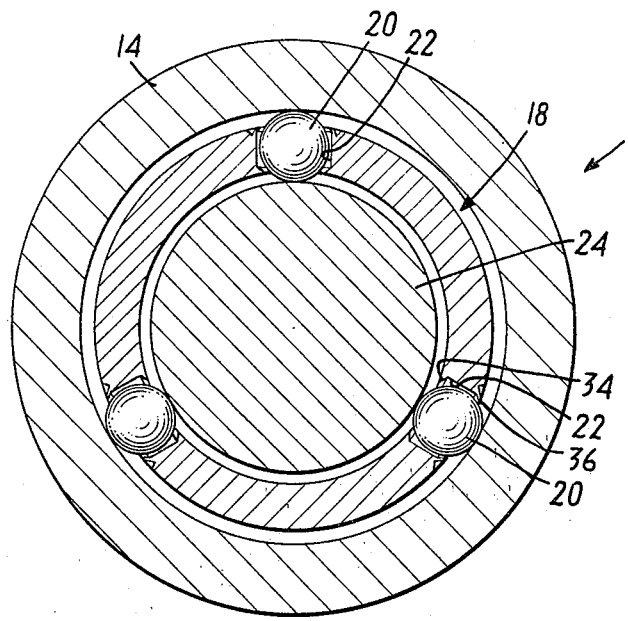
FIG. 3 is an end view of the bearing on an enlarged scale in section taken generally along the line 3—3 of FIG. 1, and in the direction of the arrows.

Referring now to FIGS. 3 and 4, the balls 20 are held in the holes 22 in the retainer by annular unturned lips or flanges 34 and 36. More particularly, as best shown in FIG. 4, the holes 22 in the retainer 18 are formed by drilling almost but not quite through the retainer, thereby leaving a lip 34 at the inner end of the hole 22. The outer lip 36 is formed by cutting a small annular groove 38 adjacent the hole. After the balls are inserted into the holes from the outside, the rib portion on the inner edge of the groove 38 is bent inwardly to form the lip 36, which holds the balls in the holes.

Figure 2:
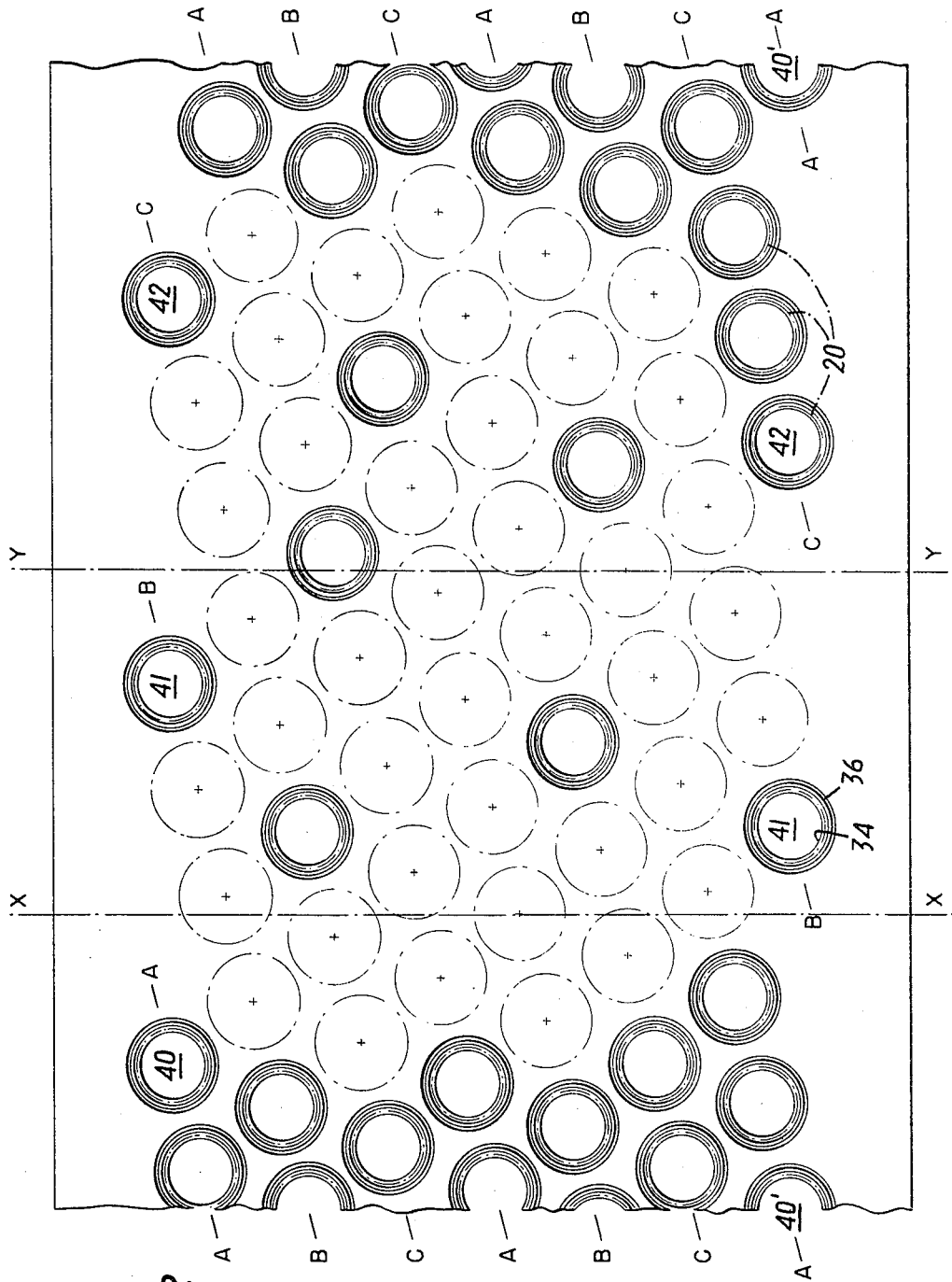
FIG. 2 is an expanded view of the retainer, illustrating it as a flat member and showing the arrangement of balls therein.

The holes 22 in the retainer, and therefore the balls 20, are arranged, as best illustrated in FIG. 2, in the retainer 18 in three helical rows, designated by the letters A, B and C. It will be understood, of course, that the helical rows appear as straight lines, inasmuch as FIG. 2 is a view representing the surface of the retainer 18 as if it has been severed generally along a longitudinal line and flattened out. The helical rows begin and end with balls 40 to 42 and 40' to 42' which are centered in transverse planes normal to the axis of the retainer, the balls in each helical row are spaced apart an equal distance from each other, the rows have the same pitch angle, and therefore lie parallel to each other, and are 120° circumferentially apart. Accordingly, the balls are arranged such that exactly three lie 120° apart on each of a plurality of spaced-apart transverse planes normal to the bearing axis.

The pitch angle of the helices and the spacing of the balls is arranged so that only one ball is centered on any one plane (indicated in FIG. 2 by dotted lines X—X and Y—Y, for example) extending radially from and including the axis of the bearing, and so the tracks of the balls on the bore 16 of the bushing 14 and on the leader pin 24 do not overlap. As will be described later, a very large number of balls per unit area is provided, a number considerably greater than in conventional bearings. Because of the large number of balls, the spacing between adjacent longitudinal, radial planes may sometimes be very small. However, wide spacing is unnecessary, inasmuch as the tracks which the balls traverse are defined by only thin lines of contact between the balls and the respective surfaces of the bushing 16 and leader pin 24. Accordingly, very small spacing may be provided between the tracks of the bearings without loss of the advantage of distributing the bearing loads over as many separate tracks as there are balls in the bearing.

As mentioned briefly in the previous paragraph, the number of balls is preferably as great as possible, insofar as it is consistent with the desirability of retaining the structural integrity of the retainer. Accordingly, the number of contact points provided between the balls and the sleeve 14 and the leader pin 24 is preferably maintained constant regardless of the size of the bearing. More particularly, it has been found that the preferred number of contact points is between 26 and 28 per square inch on the bore 16 and the bushing 14. It will be observed that the number of contact points between the balls and the leader pin will be somewhat greater per unit area, even though the total number of contacts for the bearing will, of course, be the same. By increasing the number of contact points over the number in conventional die-set bearings, the total area over which the forces acting on the bearing are distributed may be increased to as much as three times that provided by conventional die-set bearings. The greater contact area between the balls and the bushing 14 and leader pin 24 further reduces and distributes thrusts and frictional loads on the elements of the bearing, thereby considerably increasing their useful life.

As aforementioned, conventional die-set bearings are generally heavily pre-loaded, by making the size of the balls greater than the width of the annular space between the leader pin and the sleeve, in order to afford greater resistance to wobbling and poor alignment of the leader pin in use. The substantial pre-loading, however, reduces the useful life of the bearing by increasing the compressive and bearing loads on the bearing elements. In a bearing, in accordance with the invention, the greater number of balls per unit area enables a considerable reduction in pre-loading of the balls, say 0.0004 in. to 0.0005 in. difference between the diameter of the balls and the annular space between the leader pin and the sleeve. Whereas each ball is therefore subjected to a much lower pre-load than that which is usually provided, the greater number of balls nevertheless results in an equal or greater total load. In other words, while the resistance to rocking or milalignment of the leader pin may be equal for a die-set bearing in accordance with the invention and a die-set bearing of conventional form, the loading is distributed over a substantially greater number of balls, and the pre-loading of each ball may be reduced substantially.

While in the illustrated embodiment of the die-set bearing structure, the three helical rows of bearings are spaced apart radially 120°, it will be apparent that the leader pin will be properly and adequately supported and centrally aligned by any arrangement of bearings wherein three bearings are disposed on a given transverse plane and lines connecting their centers form a triangle which encompasses the axis of the leader pin.

It will be understood by those skilled in the art that the above described embodiment of a die-set bearing, in accordance with the invention, is susceptible of considerable modification and variation without departing from the spirit and scope of the invention. All such modifications and variations are intended to be included within the scope of the invention as defined in the appended claims.

I claim:
1. A die-set bearing, comprising a cylindrical bushing having a bore therein, a retainer having a plurality of holes therein and movably positioned in said bushing bore, a plurality of balls rotatably disposed in said retainer holes and contacting said bushing bore, and a leader pin movably positioned within said retainer and contacting said balls, said balls being arranged in exactly three helices defined on said retainer, the three balls at each of the opposite ends of said helices being disposed on a single plane normal to the axis of the bearing, the axis of the bearing lying within the triangle formed by lines connecting the centers of said three balls at each of opposite ends of the three helices, and said balls being arranged such that only one of said balls has its center lying in any one plane extending radially from and including the axis of the bearing.

2. The bearing claimed in claim 1, wherein said balls are arranged to provide about 26 to about 28 contact points per square inch of surface area of said bushing bore.

3. The bearing claimed in claim 1, wherein said three balls at each of the ends of said three helices are spaced apart radially 120°, said helices have equal pitch angles, the balls in each of said three helices are equally spaced-apart and the spacing of the balls is equal for all of said three helices.

4. The bearing claimed in claim 1, wherein the diameter of said balls is about 0.0004 inch to about 0.0005 inch greater than the width of the annular space between said bushing bore and the surface of said leader pin.

References Cited by the Examiner

UNITED STATES PATENTS

| | | | |
|---|---|---|---|
| 1,976,637 | 10/1934 | Scott | 308—201 |
| 3,003,830 | 10/1961 | Blazek | 308—6 |

FOREIGN PATENTS

| | | |
|---|---|---|
| 466,728 | 5/1914 | France. |
| 23,422 | 11/1908 | Great Britain. |
| 71,957 | 1/1913 | Switzerland. |

DAVID J. WILLIAMOWSKY, *Primary Examiner.*

L. L. JOHNSON, *Assistant Examiner.*